(12) United States Patent
Motter et al.

(10) Patent No.: US 7,057,616 B2
(45) Date of Patent: Jun. 6, 2006

(54) USING CONSTRAINED OPTIMIZATION IN CURVE EDITING

(75) Inventors: DoRon B. Motter, Issaquah, WA (US); Michael Kallay, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 35 days.

(21) Appl. No.: 10/831,264

(22) Filed: Apr. 23, 2004

(65) Prior Publication Data

US 2005/0237325 A1 Oct. 27, 2005

(51) Int. Cl.
*G06T 11/20* (2006.01)
(52) U.S. Cl. ........................ 345/442; 345/441; 715/863
(58) Field of Classification Search ........ 345/441–443, 345/422; 715/863

See application file for complete search history.

(56) References Cited

U.S. PATENT DOCUMENTS

| | | | | |
|---|---|---|---|---|
| 5,367,617 A | * | 11/1994 | Goossen et al. | 345/442 |
| 5,621,872 A | * | 4/1997 | Tokumasu et al. | 345/442 |
| 5,636,338 A | * | 6/1997 | Moreton | 345/442 |
| 6,208,355 B1 | * | 3/2001 | Schuster | 345/442 |
| 6,727,901 B1 | * | 4/2004 | Gupta | 345/442 |

OTHER PUBLICATIONS

Foley et al., "Computer Graphics: Principles and Practice Second Edition in C," Addision-Wesley Publishing Company, 1996, pp. 491 and 501.*
Foley et al., "Computer Graphics: Principles and Practice, Second Edition in C," Addision-Wesley Publishing Company, 1996, pp. 491, 501.*
http://en.wikipedia.org/wiki/Integral Wikipedia.org definition of Integral.*
Brunnett, G. et al., "Interpolation with Minimal-Energy Splines", *Computer-Aided Design*, Feb. 1994, 26(2), 137-144.
Kallay, M., "Constrained Optimization in Surface Design", *Modeling in Computer Graphics*, 1993, B. Falcidiano and T.L. Kunii(Eds), Springer-Verlag, Berlin-Heidelberg, 5 pages.
Kallay, M., "Plane Curves of Minimal Energy", *ACM Transactions on Mathematical Software*, Sep. 1986, 12(3), 219-222.
Von Golitschek, M. et al., "Error Bounds for Minimal Energy Bivariate Polynomial Splines", *Numer. Math.*, 2002, 93, 315-331.

* cited by examiner

*Primary Examiner*—Matthew C. Bella
*Assistant Examiner*—Alysa Brautigam
(74) *Attorney, Agent, or Firm*—Woodcock Washburn LLP

(57) ABSTRACT

A curve may be reshaped by determining new locations for its control points that minimize some measure of the change in the curve (typically, the "energy" of the change), while meeting the specified editing constraints. For example, a designer or other user may indicate an editing constraint by selecting a point anywhere on a curve and moving it to a new location. In response, the unconstrained control points may be moved automatically and simultaneously to optimal new locations. The resulting change in the curve may be aesthetically pleasing and satisfy the editing constraints. This curve editing technique may allow designers to be more productive by providing predictable and intuitive results while enabling curves to be directly manipulated.

33 Claims, 5 Drawing Sheets

FIG. 4a  FIG. 4b

USING CONSTRAINED OPTIMIZATION IN CURVE EDITING

FIELD OF THE INVENTION

The invention relates to computing and in particular to reshaping a curve in computer graphics by minimizing an energy function subject to editing constraints.

BACKGROUND OF THE INVENTION

Graphic designers want tools that enable them to quickly and easily modify shapes. Within graphic design applications, these shapes are often modeled using curve representations that are defined by a sequence of control points, where the position of each control point has some influence on the shape of the curve. Examples of such shape representations include Bézier curves, B-splines, non-uniform rational B-splines (NURBS), and subdivision curves, among others. Graphic design applications typically allow the designer to edit a shape by moving one or more control points until the desired shape is achieved. Because several control points may need to be moved by different amounts in different directions to achieve the desired result, it can be tedious to edit a shape in this manner. Applications often provide a more convenient means of curve editing in which the designer can click on any point on the curve and drag it to a new location—a method often referred to as "direct manipulation," since the designer deals directly with the curve rather than with its control points. Curve editing methods that support direct manipulation must solve an equation or a series of equations to determine new locations for the curve's control points that will force the curve to pass through the point that the designer specified.

In an ideal world, a designer could click on any point on the curve and "pull" it, and the curve would follow in an intuitive manner. Unfortunately, reality does not always meet expectations. For instance, some applications that permit direct manipulation of open-ended curves display unpredictable results when the designer attempts to drag a point on the curve that is close to one of the curve endpoints. Sometimes a small movement by the designer results in an inordinately large change in the curve. In extreme cases, the edited curve may include unwanted loops, or a change may unexpectedly invert the curve. It would be helpful if graphics applications provided an intuitive, simple, and fast way for a designer to achieve the desired curve without encountering these unpredictable anomalies.

SUMMARY OF THE INVENTION

A curve is reshaped by determining new locations for its control points that minimize some measure of the change in the curve (typically, the "energy" of the change), while meeting the specified editing constraints. For example, a designer may indicate an editing constraint by selecting a point anywhere on a curve and moving it to a new location. In response, the unconstrained control points may be moved automatically and simultaneously to optimal new locations. The resulting change in the curve may be aesthetically pleasing and satisfy the editing constraints. This curve editing technique may allow designers to be more productive by providing predictable and intuitive results while manipulating curves directly.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIGS. 4a–c are diagrams of a Bézier curve as edited in accordance with one aspect of the invention.

DETAILED DESCRIPTION OF ILLUSTRATIVE EMBODIMENTS

Overview

A user of a vector drawing tool has several implicit expectations of a click and drag edit, namely:

The targeted point should follow the mouse pointer during the drag.

The edit should be local: points on the curve far from the edit point should not be affected.

The edit should be stable: small movements of the mouse should not result in large changes to the curve.

The edit should be intuitive in that the shape of the curve should only be distorted as much as necessary for it to meet the above requirements.

A curve frequently used as the underlying representation in vector drawing tools is the piecewise cubic Bézier spline. The invention described herein is independent of the underlying curve representation; however, because the piecewise cubic Bézier spline is one of the most commonly used representations, descriptions of the method will be given in terms of this representation. It will be understood that the method may be applied to any curve A Bézier spline is a mathematical representation of a shape, consisting of a sequence of connected Bézier curves. A Bézier curve is a mathematical construct that requires only a few control points to specify a continuous curve in two- or three-dimensional space. In particular, a cubic Bézier curve is completely defined by four control points: the two endpoints of the curve, and two additional control points. The positions of the two additional control points specify the tangent directions at the beginning and end of the curve, and thus determine the shape of the interior of the curve. Therefore these two points are referred to as "interior" control points.

Figure 2:
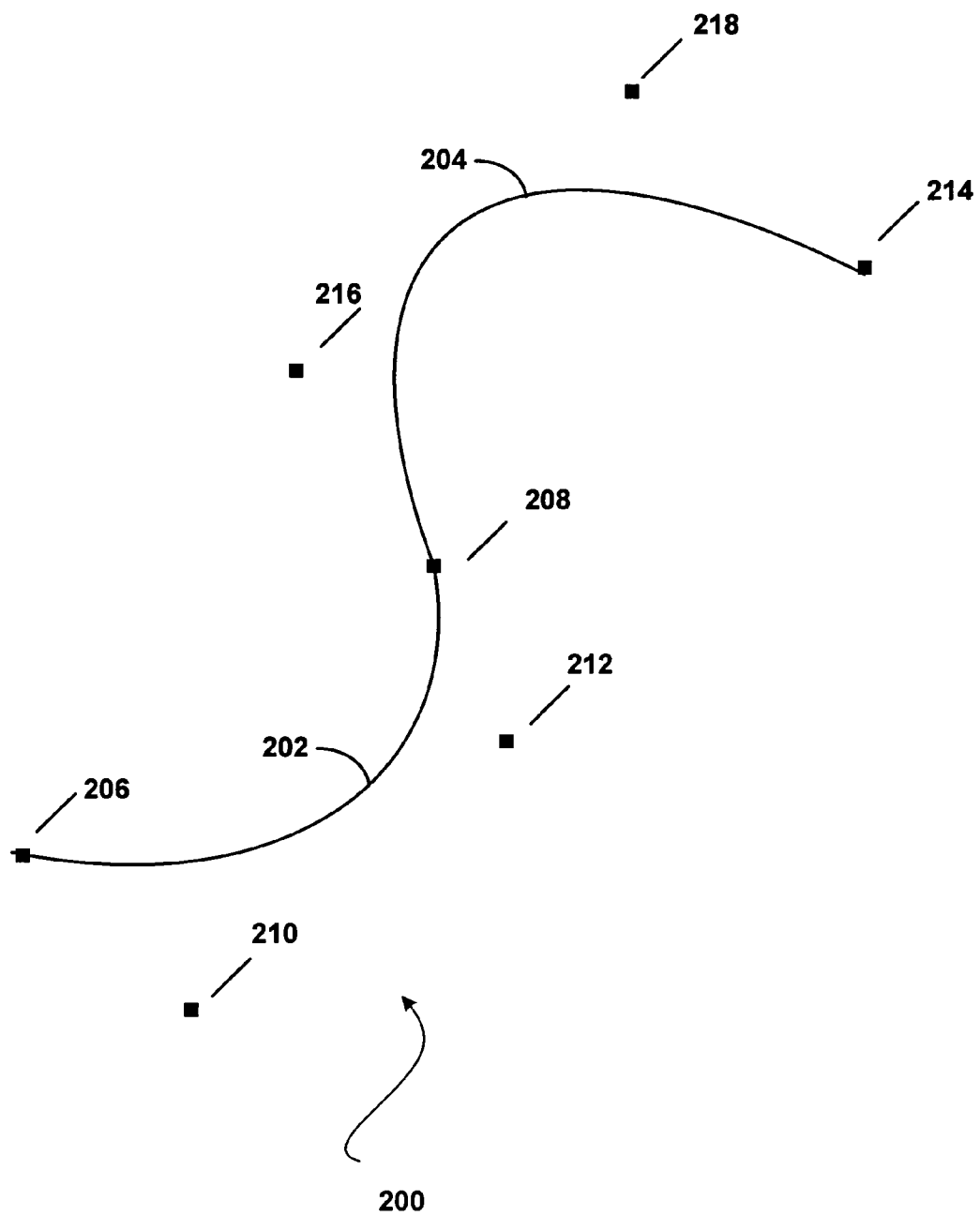
FIG. 2 is an exemplary Bézier spline.

FIG. 2 illustrates an exemplary Bézier spline 200. Bézier spline 200 is divided into two curves, curves 202 and 204. Curve 202 is defined by endpoints 206 and 208 and interior control points 210 and 212. Curve 204 is defined by endpoints 208 and 214 and interior control points 216 and 218. Once its four control points are specified, each Bézier curve can be generated by a well-known iterative process. The four control points and their locations are stored for each curve of the spline. To edit a particular curve, one need only specify how its four control points change, since the curve is completely defined by those four control points.

A piecewise continuous Bézier spline F consists of a sequence of |F| connected degree d Bézier curves $F_k(t)$, each of which is defined by $$F_k(t) = \sum_{i=0}^{d} P_{k,i} b_{i,d}(t), \text{ where, } b_{i,d}(t) = \binom{d}{i} t^i (1-t)^{d-i}$$

and for every $k \in [0, |F|-1]$, $P_{k,d} = P_{k+1,0}$.

In the case of cubic Bézier splines (d=3), and $b_i(t) = b_{i,3}(t)$, and thus curve definition simplifies to:

$$F_k(t) = \sum_{i=0}^{3} P_i b_i(t), \text{ where } b_0(t) = (1-t)^3, b_1(t) = 3t(1-t)^2,$$

$$b_2(t) = 3t^2(1-t), b_3(t) = t^3.$$

As shown in FIG. 2, each cubic Bézier curve (e.g., 202) is defined by four control points, (e.g., 206, 208, 210 and 212 for curve 202 and 208, 214, 216 and 218 for curve 204) where the first and last control points may be shared between adjacent Bézier curves in the piecewise sequence (e.g., 208 is both an end point of curve 202 and curve 204). Additional constraints may be placed on the control points, to prevent corners, for instance.

A user who attempts to edit a curve may or may not be familiar with the underlying curve representation. For a user who understands the purpose of control points within his curve, an additional requirement is to preserve the underlying structure of the curve as much as possible. Regardless of the user's understanding, the curve change should be local in order to meet the user's intuitive expectations.

In some embodiments of the invention, a curve is modified in response to a drag gesture by determining the locations of control points such that the curve segment passes through the pointer location. In some embodiments of the invention, the first and last control points (the endpoints) are fixed. For cubic Bézier curves, and other curve representations, the resulting problem is under-constrained: that is, there are more degrees of freedom than there are constraints. In some embodiments of the invention, the remaining degrees of freedom are used to provide a smoother and more intuitive response. In some embodiments of the invention, a minimum-energy curve edit utilizes this extra freedom. That is, the maximization of the smoothness change is used to compute the updated control points. Because the energy of a flexible beam increases as it is being bent further, maximizing smoothness is achieved by minimizing bending energy.

In accordance with some embodiments of the invention, a point on a curve can be selected (e.g., by clicking on the point) and dragged, modifying the location of both the interior control points at the same time, subject to constraints. In some embodiments of the invention, the point selected is between the interior control points and the energy of the change is minimized by solving a constrained optimization problem. In some embodiments of the invention the constraints are that the edited curve as displayed goes through the selected point (the point that is selected by the pointer and pulled) and the edited curve retains its original end points. A goal function is determined and minimized. In some embodiments of the invention, the goal function is an integral (the sum along the curve) of the squared magnitude of the second derivative vector of the change between the original curve and the edited curve. This integral is related to bending energy, hence the term "energy". Minimizing that energy leads to the smoothest change.

Exemplary Computing Environment

Figure 1:
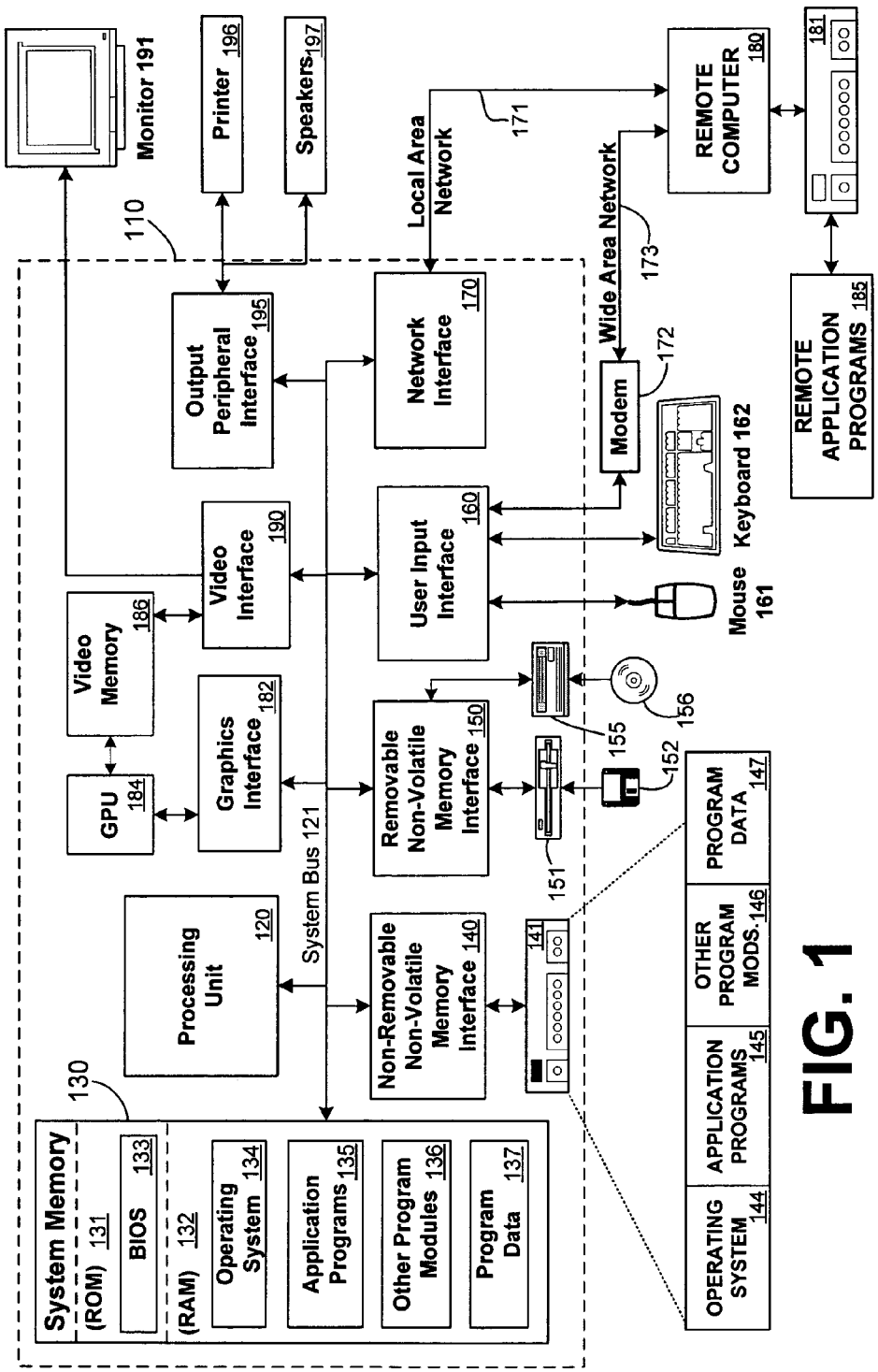
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1*a* illustrates operating system 134, application programs 135, other program modules 136, and program data 137.

The computer 110 may also include other removable/non-removable, volatile/nonvolatile computer storage media. By way of example only, FIG. 1*a* illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1*a*. The logical connections depicted in FIG. 1*a* include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1a illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

System and Method for Performing Minimum Energy Curve Editing

Figure 3:
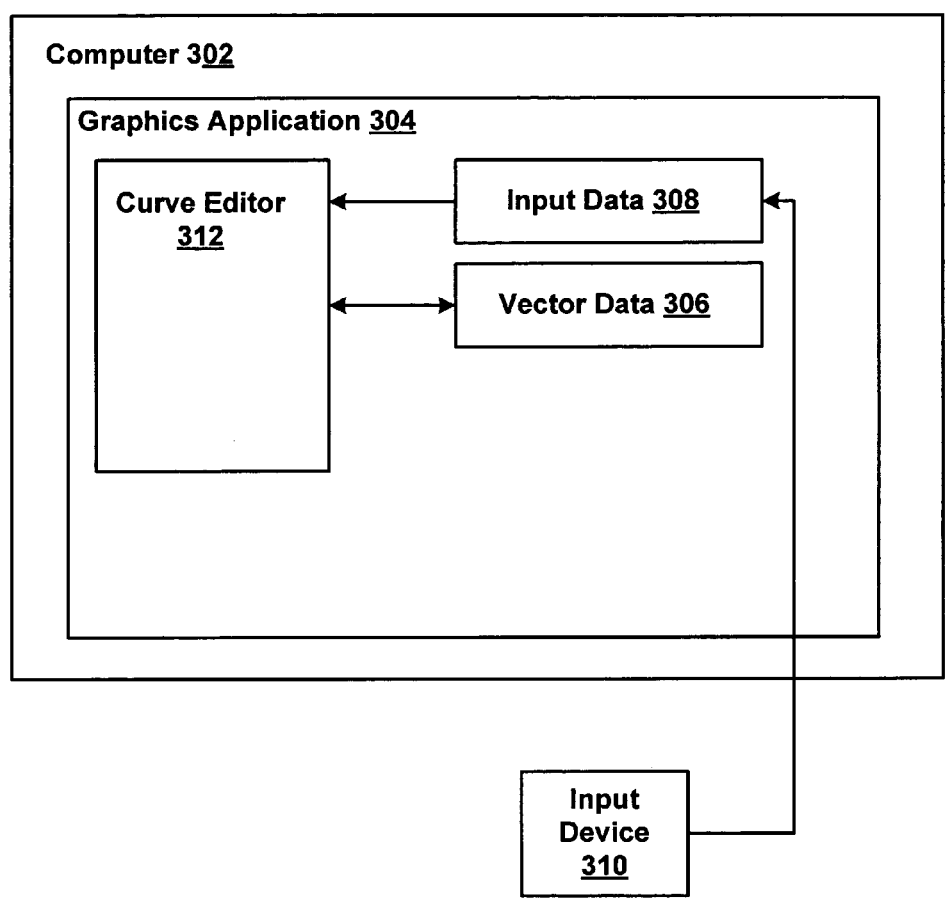
FIG. 3 is a block diagram of an exemplary system for editing curves in a graphics application in accordance with one embodiment of the invention.

FIG. 3 illustrates an exemplary system for editing curves in accordance with some embodiments of the invention. Such a system may reside in whole or in part on one or more computers, such as exemplary computer 302 of FIG. 3. Computer 302 may comprise a computer such as computer 110 described with respect to FIG. 1. A system for editing curves may comprise one or more of the following elements: a graphics application 304, vector data 306, input data 308, an input device 310 and a curve editor 312. Curve editor 312 may be integrated within graphics application 304 or may be a standalone component. Curve editor 312 may be a pluggable component that can be coupled to an existing graphics application 304. Vector data may be supplied by the graphics application 304, curve editor 312 or may be computed from input data 308 received. Input device 310 may be a mouse, touchpad or trackpoint, pen, stylus, trackball, keyboard or other pointer device for inputting data 308. Input data may comprise a point on a curve to be edited, screen coordinates or other suitable input data.

In some embodiments of the invention, the edited curve is computed via minimization of a mathematical function, the function being the integral of total curvature of the change. In some embodiments of the invention, the function that is minimized is the integral of the squared second derivative of the vector function representing the change to the curve.

Because there are more degrees of freedom than there are constraints when editing a Bézier curve as described above, the new control point locations may be computed by solving a constrained optimization problem to minimize some "energy" function subject to the editing constraints. In some embodiments of the invention, an appropriate energy function is defined, from which the new control point locations can be determined. Because the constrained optimization problem in some embodiments has a closed-form analytic solution, the resulting algorithm used to compute control point locations is efficient and easy to implement and in addition may produce a pleasing and intuitively correct editing response.

Figure 4C:
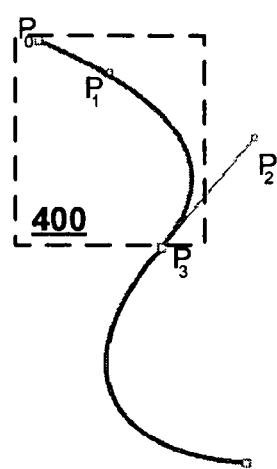
Figure 4C:
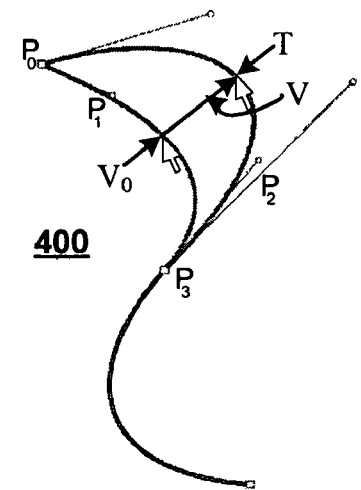
Figure 4C:
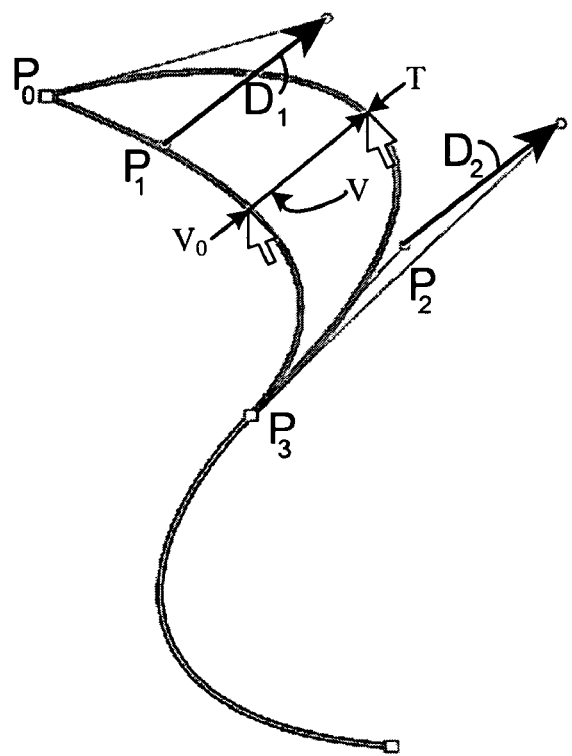

In some embodiments of the invention, the energy of a Bézier curve is calculated in terms of $D_i$, the vector change in each control point, as shown in FIGS. 4a–c. In FIG. 4a, curve 400 is defined by endpoints $P_0$ and $P_3$ and interior control points $P_1$ and $P_2$. In FIG. 4b, a point $V_0$ on curve 400 is selected and pulled to location T. It will be noted that point $V_0$ may lie anywhere on the curve. If the original curve is F(t) and the edited curve after the change is G(t) then the change C(t)=G(t)−F(t) is also a Bézier curve whose control points are $D_i$. The energy function E(C) of the change C is defined to be the integral (over the curve's domain) of the squared second derivative of the edit change C(t):

$$E(C) = \int_0^1 C'' \cdot C'' dt, \text{ where } C(t) = \sum_{i=0}^{d} D_i b_{i,d}(t).$$

The edit change C(t) in some embodiments is constrained by the scope of the problem so that the endpoints do not change. That is, the requirement $D_0=D_3=0$, is made, and the effect of the edit is restricted to a single segment 400. To ensure that the curve passes through the desired point, 404, the curve is then further constrained as follows, for a point $F_k(s)$:

$$C(s) = \sum_{i=1}^{2} D_i b_i(s) = V$$

Where T represents the new location to which the point $V_0$ is dragged and V is the drag vector.

The corresponding constrained optimization problem can then be solved via Lagrange multipliers. Because the dot product is a sum of products of coordinates, the equations break into separate systems for each coordinate (each with the same coefficients, but with a different right hand side), hence the unknowns $D_i$ ($D_1$ and $D_2$ in FIG. 4c) turn out to be scalar multiples of the drag vector V. For the case of a cubic Bézier curve and the energy function outlined above, the constrained optimization problem can be solved analytically to yield:

$$D_1 = \frac{2b_1(s) + b_2(s)}{2(b_1(s)^2 + b_2(s)^2 + b_1(s)b_2(s))} V$$

$$D_2 = \frac{2b_2(s) + b_1(s)}{2(b_1(s)^2 + b_2(s)^2 + b_1(s)b_2(s))} V$$

It will be noted that the scalar coefficients depend only on the curve parameters, and not on any variable which changes during the course of the edit.

Figure 5:
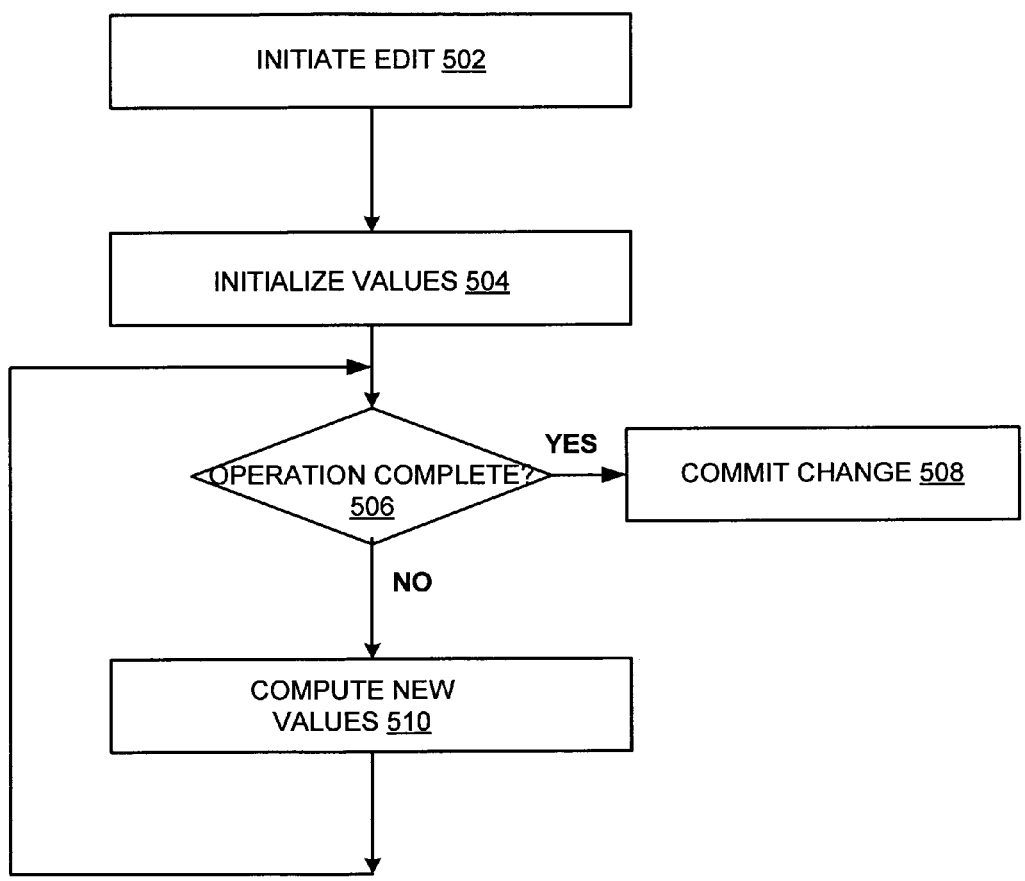
FIG. 5 is a flow diagram of a method of editing curves in a graphics application in accordance with one embodiment of the invention.

FIG. 5 is a flow diagram of a process of editing curves in accordance with some embodiments of the invention. One or more steps of the method may be optional. At step 502 an edit process is initiated. In some embodiments of the invention, an edit begins when an event such as (but not limited to) MouseButtonDown is raised, although it will be understood that the invention as contemplated is not limited to the use of a particular event or programming technique nor to a particular input device. Although any suitable input device including but not limited to the ones described above with respect to FIG. 3 may be used, to facilitate understanding, the following description will be given in terms of a mouse input device.

At step 504 values are initialized. The parameter of a point on the Bézier curve which is closest to the location of the mouse click on a display screen is approximated. In some embodiments, the curve is parameterized from 0 (at one endpoint) to 1 (at the other endpoint), so that every point along the curve may be represented by a number between 0 and 1. Each parameter thus corresponds to a point along the curve as displayed. In some embodiments, the curve is reproduced by dividing the curve into a number of sections of straight lines. Thus, the position of each point on the curve can be represented (e.g., on a computer screen) by evaluating the four control points and the parameter. It will be understood that because a curve is theoretically infinitely thin, a point along the curve cannot be exactly selected via a mouse click, so the parameter for a point on a curve that approximates the position of the mouse click is determined. That is, a point on a curve is defined as $F_k(s)$, where s is the parameter of the closest point on the desired segment $F_k(t)$ to the mouse position, or:

s←the parameter of the closest point on the desired segment $F_k(t)$ to the mouse position.

In some embodiments of the invention, $V_0$ is the location of the selected point, that is the coordinates of the point, or:

$V_0 \leftarrow F_k(s)$ $a_1$ and $a_2$ are calculated, according to the following formulas, where $b_1$ and $b_2$ and s are defined as described above. $a_1$ and $a_2$ represent the solution of the minimization problem.

$$a_1 \leftarrow \frac{2b_1(s) + b_2(s)}{2(b_1(s)^2 + b_2(s)^2 + b_1(s)b_2(s))}$$

$$a_2 \leftarrow \frac{2b_2(s) + b_1(s)}{2(b_1(s)^2 + b_2(s)^2 + b_1(s)b_2(s))}$$

The original four control points are copied to preserve a location of the original point on the curve as follows:

$O \leftarrow P_k$ $P_k$ thus represents the control point vector for segment k.

At step 506, user input is monitored to determine if the curve editing operation is complete. In some embodiments of the invention, an edit ends when an event such as (but not limited to) MouseButtonUp is raised, although it will be understood that the invention as contemplated is not limited to the use of a particular event or programming technique nor to a particular input device. If the editing process is complete, at step 508 the operation is committed and the edited curve is displayed.

At step 510, as the selected point is dragged during the curve edit operation, control points are computed as follows. During a mouse move, V may be defined as a change in mouse position, that is $V \leftarrow T - V_0$ $V_0$ may be defined as the initial location of the selected point, T may represent the current location of the mouse pointer so that V represents the change in mouse position. $D_1$ is computed by multiplying V by the constant initialized above, $a_1$ or:

$D_1 = a_1 V$ $D_2$ is computed by multiplying V by the constant initialized above, $a_2$ or:

$D_2 = a_2 V$

The new positions of the interior control points ($P_{k,1}$ and $P_{k,2}$) are computed as follows:

$P_{k,1} = O_1 + D_1$ $P_{k,2} = O_2 + D_2$ from the old positions of the control points ($O_1$ and $O_2$), adding in the change $D_1$ and $D_2$ computed from the change in mouse position V and the constants $a_1$ and $a_2$.

The edited curve, as computed above may be displayed.

It will be apparent to one of skill in the art that the solution vectors of the minimization problem are multiples of the drag vector V.

It will be appreciated that, with different basis functions $b_1$, the formula $$F_k(t) = \sum_{i=0}^{d} P_{k,i} b_{i,d}(t)$$

is a general template for a broad class of splines, of which the Bézier spline is only one type. This class includes B-splines, subdivision curves and NURBS, (non-uniform rational B splines). While closed formulae for the integrals may not be as readily available as for the Bézier curve, they may be dynamically computed by solving a linear system of equations.

It will be appreciated that while the embodiment described utilizes a minimization of an integral of a squared second derivative of the change, the invention as contemplated is not so limited. For example, any other suitable function could be minimized, as for example the function representing the true total curvature of the change.

Similarly, the present invention may be applied to editing of surfaces by minimizing some energy function of the change. Surfaces are typically defined by some two-dimensional grid or mesh of control points. It is desirable to allow the user to pull a point on the surface and have that affect multiple control points. While in the curve editing the displacement vectors are computed by minimizing integrals of one variable, with respect to surfaces, integrals of two variables are minimized, (e.g. some function of the partial derivatives).

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A curve-editing system comprising:
a processor having memory, the memory storing at least one software application; and
a curve editor software application that receives editing constraints and an original curve, F(t), the original curve defined by a set of control points, and generates an edited curve, G(t), by minimizing an energy function of a change while satisfying the editing constraints, the change comprising a difference between the original curve and the edited curve, C(t)=G(t)−F(t), wherein the energy function of the change is an integral of a squared second derivative of a vector function representing the change to the original curve, and wherein the energy function is defined as:

$$E(C) = \int_0^1 C'' \cdot C'' \, dt.$$

2. The system of claim 1, wherein the edited curve is a Bézier curve.
3. The system of claim 1, wherein the edited curve is a B-spline curve.
4. The system of claim 1, wherein the edited curve is a non-uniform rational B-spline curve.
5. The system of claim 1, wherein the edited curve is a subdivision curve.
6. The system of claim 1, wherein the function is an integral of a curvature of the change.
7. The system of claim 1, wherein the function is an integral of a squared second derivative of the change.
8. The system of claim 1, wherein the curve editor is integrated within a graphics application.
9. The system of claim 1, wherein the curve editor is a pluggable component for plugging into a graphics application.
10. The system of claim 1, wherein the editing constraints require the edited curve to pass through a prescribed point.
11. The system of claim 10, wherein the prescribed point is computed by combining a given point on the original curve with a vector change.
12. The system of claim 1, wherein the editing constraints require a subset of control points to remain unchanged.
13. A method of editing curves comprising:
receiving editing constraints associated with an original curve, F(t), the original curve defined by a set of control points; and
generating an updated curve, G(t), by minimizing an energy function of a change, while satisfying the editing constraints, the change being a difference between the original curve and the updated curve, C(t)=G(t)−F(t), wherein the energy function of the change is an integral of a squared second derivative of a vector function representing the change to the original curve, and wherein the energy function is defined as:

$$E(C) = \int_0^1 C'' \cdot C'' \, dt.$$

14. The method of claim 13, wherein the updated curve is a Bézier curve.
15. The method of claim 13, wherein the updated curve is a B-splint curve.
16. The method of claim 13, wherein the updated curve is a non-uniform rational B-spline curve.
17. The method of claim 13, wherein the updated curve is a subdivision curve.
18. The method of claim 13, wherein the function is an integral of a curvature of the change.
19. The method of claim 13, wherein the function is an integral of a squared second derivative.
20. The method of claim 13, wherein the editing constraints comprise that the updated curve must pass through a prescribed point.
21. The method of claim 20, wherein the prescribed point is computed by combining a given point on the original curve with a vector change.
22. The method of claim 21, wherein the vector change is computed such that the prescribed point matches a current position of an input device.
23. The method of claim 21, wherein the vector change is a function of a current position of an input device and a position of the input device at a beginning of an edit.
24. The method of claim 13, wherein the editing constraints comprise that a subset of control points remains unchanged.
25. The method of claim 24, wherein the subset of control points comprises end points.
26. A computer-readable medium comprising computer-executable instructions comprising;
receiving editing constraints associated with an original curve, F(t), the original curve defined by a set of control points; and
generating an updated curve, G(t), by minimizing an energy function of a change applied to the set of control points, while satisfying the editing constraints, the change being a difference between the original curve and the updated curve, C(t)=G(t)−F(t), wherein the energy function of the change is an integral of a squared second derivative of a vector function representing the change to the original curve, and wherein the energy function is defined as:

$$E(C) = \int_0^1 C'' \cdot C'' \, dt.$$

27. The computer-readable medium of claim 26, comprising further computer-executable instructions for:
calculating the function by determining an integral of a squared second derivative.
28. The computer-readable medium of claim 26, comprising further computer-executable instructions for:
constraining the function by maintaining original endpoints.

29. The computer-readable medium of claim 26, comprising further computer-executable instructions for:
constraining the function by requiring that the edited curve go through a prescribed point.

30. The computer-readable medium of claim 29, comprising further computer-executable instructions for computing the prescribed point by combining a specified point on the original curve with a vector change.

31. The computer-readable medium of claim 30, comprising further computer-executable instructions for computing the vector change so that the prescribed point matches a current position of an input device.

32. The computer-readable medium of claim 31, comprising further computer-executable instructions for computing the vector change as a function of the current position of an input device and a position of the input device at a beginning of an edit.

33. The computer-readable medium of claim 26, comprising further computer-executable instructions for constraining the function such that a subset of the set of control points remains unchanged.

* * * * *

UNITED STATES PATENT AND TRADEMARK OFFICE
CERTIFICATE OF CORRECTION

| | | |
|---|---|---|
| PATENT NO. | : 7,057,616 B2 | Page 1 of 1 |
| APPLICATION NO. | : 10/831264 | |
| DATED | : June 6, 2006 | |
| INVENTOR(S) | : DoRon B. Motter et al. | |

It is certified that error appears in the above-identified patent and that said Letters Patent is hereby corrected as shown below:

In column 2, line 46, after "curve" insert -- . --.

In column 10, line 15, delete "$b_1$," and insert -- $b_i$, --, therefor.

In column 12, line 13, in Claim 15, delete "B-splint" and insert -- B-spline --, therefor.

In column 12, line 41, in Claim 26, delete "comprising;" and insert -- comprising: --, therefor.

Signed and Sealed this

Twenty-seventh Day of July, 2010

David J. Kappos
*Director of the United States Patent and Trademark Office*